US008868577B2

(12) United States Patent
Wei et al.

(10) Patent No.: US 8,868,577 B2
(45) Date of Patent: Oct. 21, 2014

(54) GENERIC DATABASE MANIPULATOR

(75) Inventors: Haichao H. Wei, Shanghai (CN); Ling L. Shi, Shanghai (CN)

(73) Assignee: SAP SE, Walldorf (DE)

( * ) Notice: Subject to any disclaimer, the term of this patent is extended or adjusted under 35 U.S.C. 154(b) by 329 days.

(21) Appl. No.: 11/394,872

(22) Filed: Mar. 31, 2006

(65) Prior Publication Data

US 2007/0239751 A1    Oct. 11, 2007

(51) Int. Cl.
*G06F 17/30* (2006.01)

(52) U.S. Cl.
CPC .............................. *G06F 17/30377* (2013.01)
USPC ........................................ 707/756; 707/796

(58) Field of Classification Search
None
See application file for complete search history.

(56) References Cited

U.S. PATENT DOCUMENTS

| | | | | |
|---|---|---|---|---|
| 5,579,521 A | * | 11/1996 | Shearer et al. | 719/329 |
| 5,920,725 A | * | 7/1999 | Ma et al. | 717/171 |
| 6,502,088 B1 | * | 12/2002 | Gajda et al. | 707/2 |
| 6,651,073 B1 | * | 11/2003 | Lyle et al. | 707/202 |
| 7,013,312 B2 | * | 3/2006 | Bala et al. | 707/200 |
| 7,251,669 B1 | * | 7/2007 | Arora | 707/202 |

* cited by examiner

*Primary Examiner* — Belix M Ortiz Ditren
(74) *Attorney, Agent, or Firm* — Kenyon & Kenyon LLP

(57) ABSTRACT

A middle layer in business applications is provided to wrap all the database management operations generically, to store changed data temporarily, to validate and lock the data before updating the database, and to synchronize the data change and unlock it as a whole when a commit method is called. In embodiments, only six generic methods are needed for all data interactions. Transaction, isolation level, exception format, and performance tuning operations can be performed centrally in the six generic methods. A buffer section may be created in the middle layer. Operations such as insert, update, delete, and select are performed on data stored in the buffer. Buffered data may then be stored in a data storage device.

42 Claims, 8 Drawing Sheets

GENERIC DATABASE MANIPULATOR

BACKGROUND

The present invention relates to a data management system for a database where the database responds to data manipulation requests initiated by several users. Such databases are particularly useful in enterprise management systems, computer networks that facilitate ordinary business tasks such as issuing purchase orders, preparing quotes, scheduling product shipments and the like. In such systems, databases store various data records, called "business objects" which store data regarding these business tasks and also other business records such as information regarding customers, vendors, suppliers and distribution partners (collectively, "business partners"). Enterprise management systems may provide support to several operators, which may issue concurrent and possibly conflicting requests that address the same data record. If multiple requests to a database (called "transactions" herein) are performed without regard to each other, data consistency errors can arise.

At present, methods for transaction management is heavily dependent on a system's underlying structure and database format. For example, FIG. 1 shows a flowchart of a simple method for transaction management that may be performed in the prior art. As shown, a user1 starts a connection with a database at 101, which locks an object he is interested in at 102. If the user1 cannot successfully lock the objects he is interested in, the process returns to 101. If the lock is successfully applied to the object, no other system user (e.g., user2) can operator on the locked object. The user1 starts the transaction at 103, and performs database operations like "check," "select," "insert," "update/delete" at 104, 105, 106 and 107. If an error occurs during a database operation, the transaction rollback is done at 108, which reverts the state of the locked object to the state that it had prior to the lock. Thereafter, the process proceeds to 110. If no error occurred, the user1 may commit results of the transaction to storage, making the transaction permanent at 109, and the process proceeds to 110. At 110, the objects are unlocked and the connection is released. Other users, e.g., a user2, can perform transactions only if he can lock the objects he is interested in, as shown at 111, 112, 113, 114, 115, 116, 117, 118, 119, and 120. In such a system, if two users issue concurrent requests to a common object, only one user can lock the object. The other user's operation is delayed while the first user's lock is active.

The available transaction management requires direct support for the transactions from the database or platform. However, operations supported by databases or platforms from different vendors vary. For example, some databases may not support explicit start of a transaction, and some only support implicit database commit.

The available method requires considerable coding to handle concurrency. In a multi-user environment, there are two common models for updating data in a database: optimistic concurrency, and pessimistic concurrency. Pessimistic concurrency requires considerable amount of codes to lock and unlock data objects. Some applications use timestamp to implement optimistic concurrency, but also need considerable coding. Further, it is not possible to support both optimistic concurrency and pessimistic concurrency.

Database Control Language (DCL) like Grant, Check, Constraint, Primary Key, and Foreign Key varies in syntax in databases from different vendors. Some databases or platforms may not support Primary Key and Foreign Key check. Because of the insufficient data validation, programmers have to write considerable lines of codes to check the data before updating the database.

Thus, it would be desirable to provide a generic data manipulation method which provides effective concurrency and data validation check but is independent of the type of database and does not require excessive coding. It would also be desirable to provide a generic data manipulation method which has enhanced exception handling, performance tuning, and table entry authority check.

DETAILED DESCRIPTION

Embodiments of the present invention provide a database pre-processor (called a "middle layer" herein) for business applications that provides pre-processing for database transactions before the transactions are committed to a database. The middle layer may store changed data temporarily, may validate and lock the data before updating the database and may synchronize the changed data and unlock it as a whole when a commit method is called. In this manner, the database copy of the object may be locked and released in a shorter atomic transaction In embodiments of the present invention, only six generic methods are needed for all data interactions, and transaction, isolation level, exception format, and performance tuning can be done centrally in the six generic methods. The present invention may create a buffer section (or commit segment) in the middle layer, perform operations like insert, update, delete and select in the buffer, and finally store the data changes in the buffer in a data storage device.

In embodiments of the present invention, the middle layer may include a centralized buffer memory to store pre-processing data. The buffer memory is divided into a number of subsections, or commit segments. Different users or connections may be assigned separate buffer subsections (or commit segments). One user typically will not be able to access another user's commit segment. User stamps could be used to maintain the user-specific commit segments.

In embodiments of the present invention, different commit segments typically will not have the same records, ensured by a lock mechanism. When user transactions cause a write to a data object, for example, by operations like "insert," "update," and "delete," the data is written initially to the commit segment but not to the database itself. When a user transaction causes a read from a data object, however, such as by a select operation, the read may consider object data from the user's commit segment and the database.

Figure 2:
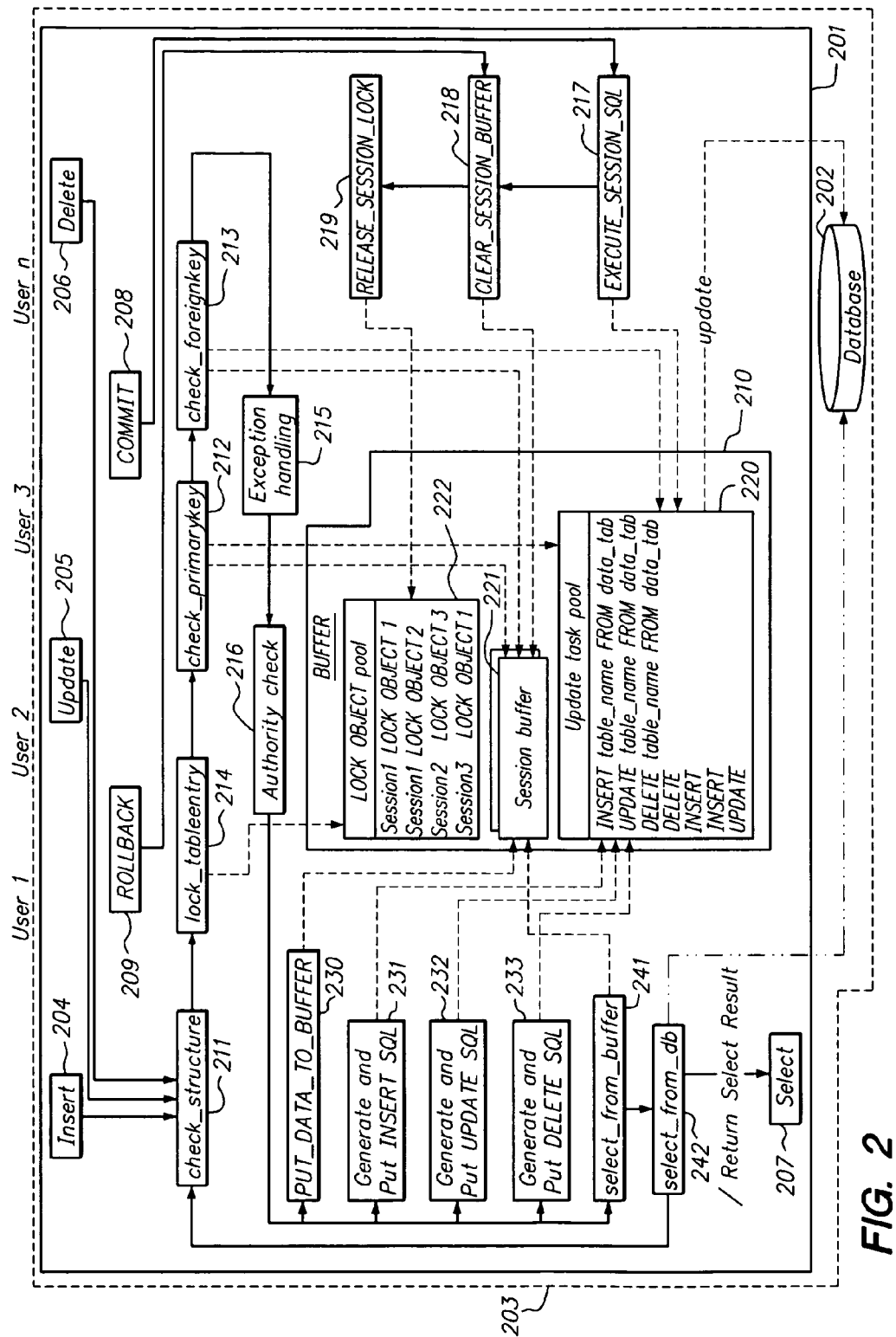
FIG. 2 is a block diagram illustrating a middle layer according to an embodiment of the present invention.

FIG. 2 shows block diagram of a middle layer according to an embodiment of the present invention. A middle layer 201 may be provided between a data storage device 202 of a server 203 and user1, user2 ... userN. The middle layer 201 may be a programming interface in the server 203 for facilitating transactions addressed to the data storage device 202. The middle layer 201 may provide the six common interfaces: an "insert" method 204, an "update" method 205, a "delete" method 206, a "select" method 207, a "commit" method 208 and a "rollback" method 209. The insert method inserts a new data item into a data object. The update method causes new data to overwrite older data in the data object. The delete method causes a data item to be deleted from the data object. The select method causes a data item to be read from the data object. The commit method causes data to be stored to a database and the rollback method reverts the state of a data object to the state it had at before a current transaction started. A transaction may be built from a sequence of these operations.

To perform a transaction, the user calls one of these common interfaces. Object data is read to the middle layer 201, and the operations may induce changes to the object data which are temporarily stored in a buffer 210. The changed data is stored in the commit segments, and is not permanently stored in the data storage device until the user calls the commit method 208. If the user does not want to permanently store the data operations, the user, for example may call the rollback method 209.

Thus, the users perform data operations by calling these interfaces, instead of writing codes. The middle layer takes care of transaction management, saving the users' time and effort.

In embodiments of the present invention, data validation also may be checked by the middle layer. For example, as shown in FIG. 2, the middle layer 201 has the following modules for data validation: a check data structure module 211, a check primary key module 212, and a check foreign key module 213.

The check data structure module 211 may ensure that the structure of the data received from a user matches the structure of the data object as it resides in the database so that the insert, update, and delete operations will not cause errors. The module 211 compares the structure of the received data and that of the data in the data storage device and in the buffer. If they are the same, the insert, update or delete operation is allowed. Otherwise, an error message is presented to the user.

A check primary key module 212 ensures that the primary key for a new entry does not exist in a database in the data storage device before an insert operation, but does exist in the database before an update operation. A primary key is the field in a database table that is indexed and maintains the main sequence of the table. If a database has the primary key of an entry, the database already has the entry, so the user can update the entry, but cannot insert an entry with the same primary key into the database. If the database does not have the primary key of an entry, the user can insert the entry into the database, but cannot perform the update operation on the entry.

Figure 3:
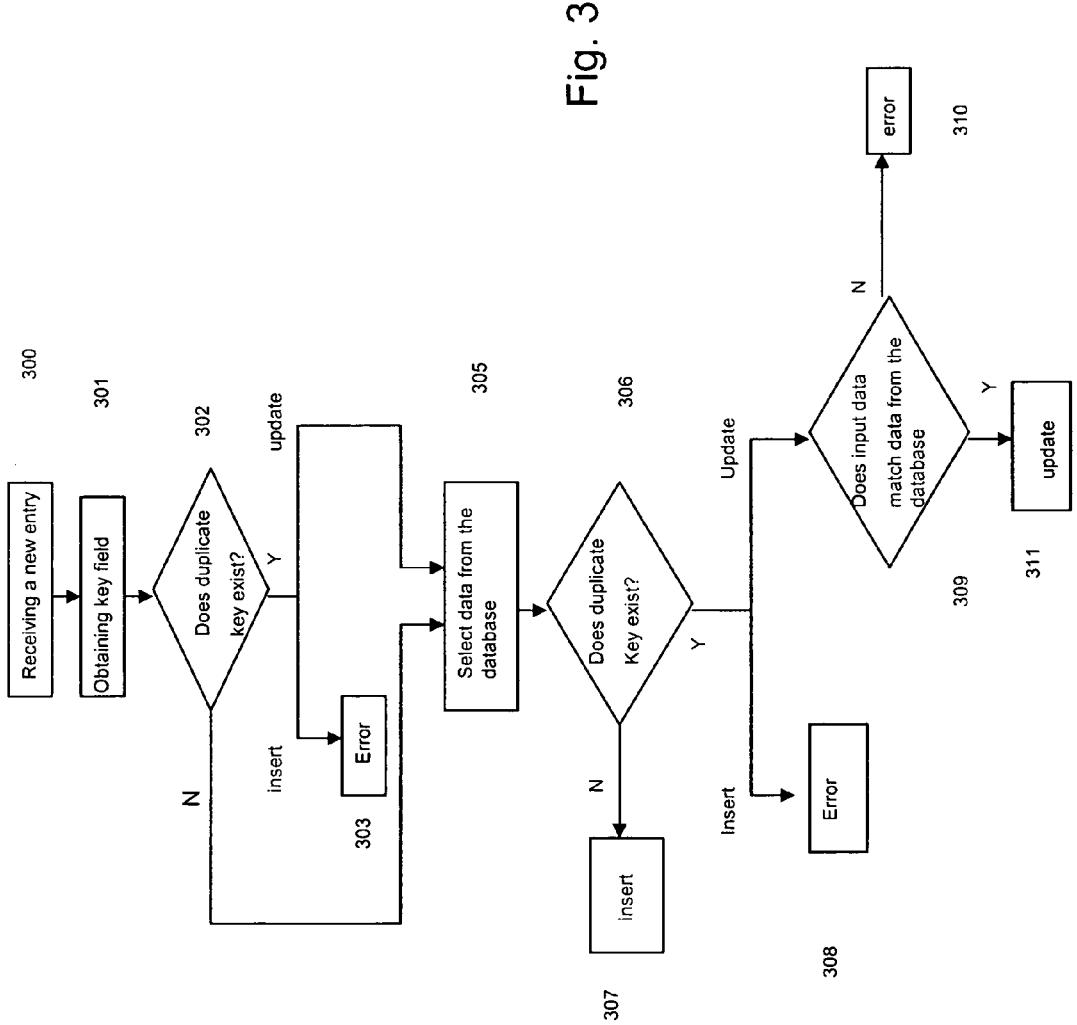
FIG. 3 is a flowchart illustrating the operation of a check primary key module according to an embodiment of the present invention.

FIG. 3 shows a flowchart of the operation of the check primary key module 212 according to an embodiment of the present invention. At 300, the middle layer receives a new entry in response to user activity. At 301, the module 212 obtains the key field by calling a data concurrency policy used to manage simultaneous access of the database. From 302 to 303, the module checks the primary key in the buffer, specifically a session buffer 221. At 302, it is determined whether a duplicate key exists in the entry. If not, the process proceeds to 305.

If a duplicate key exists and the operation is insert, an error message is presented to the user at 303. If a duplicate key exists and the operation is update, the process proceeds to 305.

Since the data operation will usually involve both data in the session buffer 221 and in the database 202, the embodiment shown in FIG. 3 checks primary key in both session buffer and the database. At 305, 306, 307, 308, 309, 310 and 311, the module may check the primary key in the database. At 305, the process may select data from the database according to the new entry and may store the retrieved data temporarily in the buffer. The module may determine at 306 whether a duplicate key exists in the retrieved data. If not, the process may proceed to 307, and an insert operation is allowed.

If a duplicate key exists in the retrieved data and the action is an insert operation, an error message may be presented to the user at 308. If a duplicate key exists and the action is an update operation, the key of the entry may be compared with that of the retrieved data at 309. If not matched, an error message may be presented to the user at 310. Otherwise, the update operation may be allowed at 311.

If a duplicate key exists at 302 and the operation is update, it is not necessary to check primary key for this entry in the database table. Accordingly, to improve efficiency, the module 212 need not check primary key for this entry in the database.

A module 213 may check whether a new entry has a foreign key before an insert or update operation. In relational database, a foreign key is a field in one table that is indexed in another.

Thus, the middle layer may check data structure, primary key and foreign key for the users. The users do not have to write codes for data validation, and considerable time and efforts can be saved.

A lock table module 214 may ensure that a lock is applied to an object before the insert, update and delete operation. When a first user reads a record from the data storage device via the middle layer, the module 214 may lock the record. The locked object is pooled in a lock object pool 222. If a second user tries to read the same record, the module 214 either will present an error message to the second user, or will allow the second user to read the record, according to an internal isolation level policy. If the second user tries to update or delete the record, the module 214 may return an error message, indicating that the record is being read, and cannot be changed.

Thus, the middle layer may implement data concurrency for the users. The middle layer may call a method "lock table" when the user accesses the buffer or the database. The concurrency handling of the present invention is independent of the type of the database being accessed, and can save the users' time and efforts on writing codes for data concurrency.

In other embodiments, a module 215 may be used for exception handling. When there is an error in data operations, data validation check or data concurrency handling, the module 215 presents to the user an error message.

A module 216 may support an authority check function, which determines whether a user has the authority to perform an intended operation. Module 216 may keep a table of user IDs of all users, and authority level of the users, i.e., the records a user has the authority to read, update, and/or delete, and whether a user has the authority to write at all. For example, some users may have permission only to read data from the data storage device, but cannot write to the data storage device. Accordingly, authority check can be done centrally by the middle layer when a user accesses the buffer or the data storage device.

Figure 4:
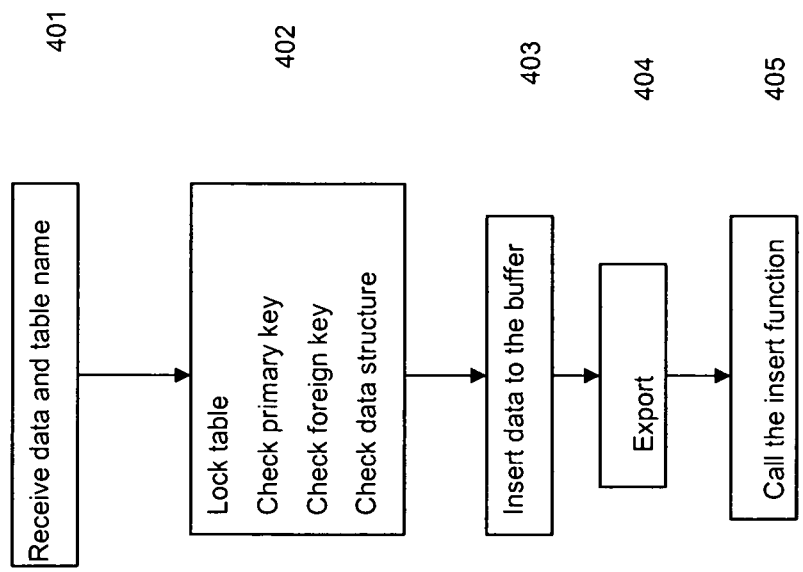
FIG. 4 is a flowchart illustrating an insert operation according to an embodiment of the present invention.

FIG. 4 shows a flowchart of an insert operation according to an embodiment of the present invention. The insert operation may insert data into the buffer temporarily or into the data storage device physically. At 401, a user may call the insert method 204 and may provide data to be inserted and the name of the table involved. At 402, the insert method may call methods for "lock table," "check primary key," "check foreign key" and "check data structure." If an error happens, the process may end.

At 403, the input data is inserted into the session buffer 221 by a Put Data to Buffer module 230. The involved table which will receive the data may be retrieved from the data storage device and saved in the session buffer 221 temporarily as a buffer table. The input data is added to the buffer table. If the buffer, or the data storage device, has no entry with the table name of the involved table, a new table name may be created and the input data may be added to it.

At 404, the changed data may be exported to a temporary storage area in the buffer.

At 405, the insert method may call an insert function in an update task module 220 via a General and Put Insert SQL module 231. The changed data is ready to be stored in the database, and is waiting for the commit method to be called.

Figure 5:
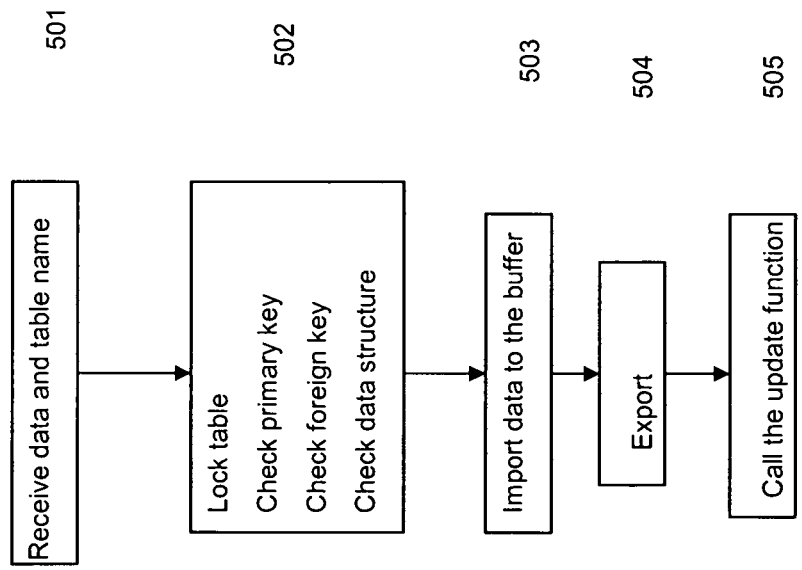
FIG. 5 is a flowchart illustrating an update operation according to an embodiment of the present invention.

FIG. 5 shows a flowchart for an update operation according to an embodiment of the present invention. The update operation may update data in the buffer and the data storage device.

At 501, a user may call the update method 205 and may provide data and the name of the table involved. At 502, the update method may call methods for lock table, check data structure, check primary key, and check foreign key. If an error happens, the process may end. At 503, the input data may be inserted into the session buffer 221 by the Put Data to Buffer module 230. At 504, the changed data may be exported to a temporary storage area in the buffer. At 505, the update method 205 may call the update function in the update task module 220 via a Generate and Put Update SQL module 232. The changed data is ready to be stored in the database, and may be stored as soon as the commit method is called.

Figure 6:
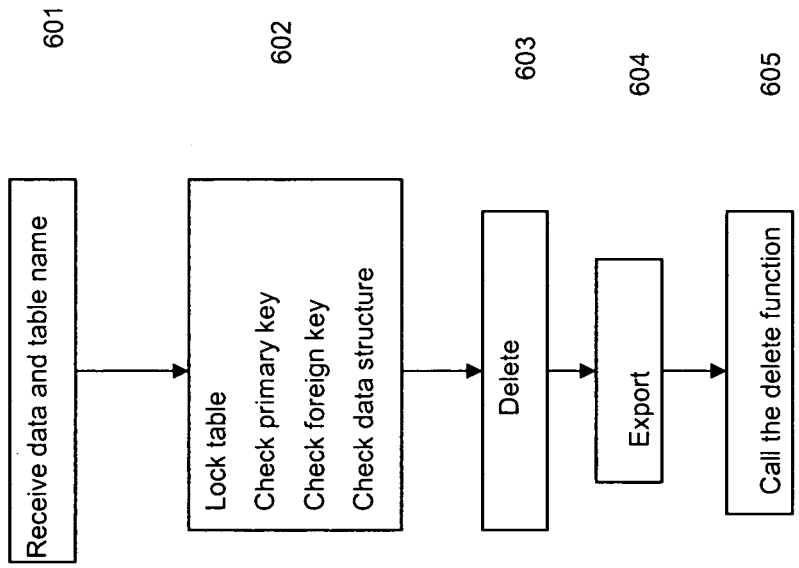
FIG. 6 is a flowchart illustrating a delete operation according to an embodiment of the present invention.

FIG. 6 shows a flowchart for a delete operation according to an embodiment of the present invention. The delete operation is used to delete data from the buffer and the data storage device.

At 601, a user may call the delete method 206 and may provide data to be deleted and the name of the table involved. At 602, the delete method may call methods such as lock table, check data structure, check primary key, and check foreign key. If an error happens, the process may end. At 603, the input data may be deleted from the session buffer 221 by the Put Data to Buffer module 230. At 604, the changed data may be exported to a temporary storage area in the buffer. At 605, the delete method 206 may call a delete function in the update task module 220 via a Generate and Put Delete SQL module 233. The changed data is ready to be stored in the database, and may be stored as soon as the commit method is called.

Figure 7:
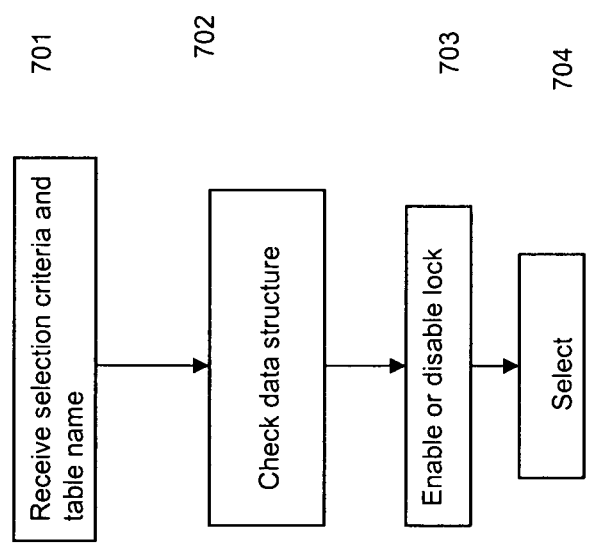
FIG. 7 is a flowchart illustrating a select operation according to an embodiment of the present invention.

FIG. 7 shows a flowchart for a select operation according to an embodiment of the present invention. The select operation is used to select data from the buffer and the data storage device according to selection criteria.

At 701, a user may call the select method 207 and may provide selection criteria and the name of the table involved. In an embodiment, the criteria support selecting by range. It has a select factor list. Each select factor may include a field name and a select range for each field. At 702, the select method may call a data structure checking method. If an error happens, the process may end. At 703, the select method may enable a lock if operating according to a pessimistic concurrency protocol or it may disable a lock if operating according to a optimistic concurrency protocol. The locked object may be pooled into the lock object pool 222. At 704, data may be selected from the buffer and the database according to select criteria, via a Select from Buffer module 241 and a Select from Database module 242.

In the embodiments shown in FIGS. 4-7, the data may be organized by the Internal Table Technology of SAP®.

A user can call a commit work module 208 to submit data changed by the insert, update and delete operations and saved in the buffer to physically store the changed data in the data storage device. The commit work module may synchronize all the changes in the user's commit segment into the database via an Execute Session SQL module 217.

The user can use a rollback work module 209 to undo the changes caused by the insert, update or delete operations.

After the commit work operation or rollback work operation, the buffer, specifically the commit segment of the user, should be cleared explicitly by calling a clear session buffer method 218. Consequently, all table locks are released by a release session lock method 219.

Figure 1:
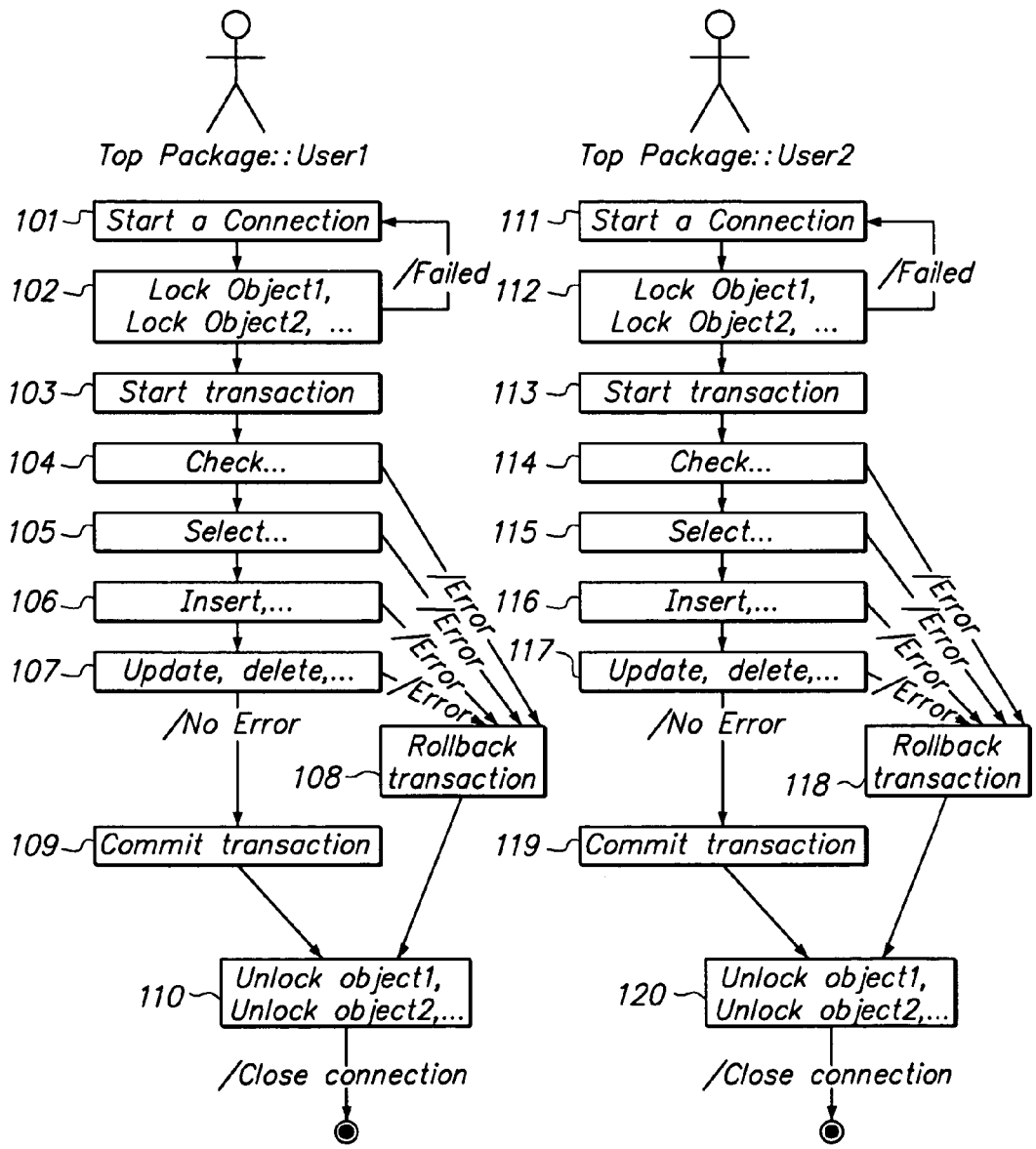
FIG. 1 is a flowchart illustrating an available method for transaction management.
Figure 8:
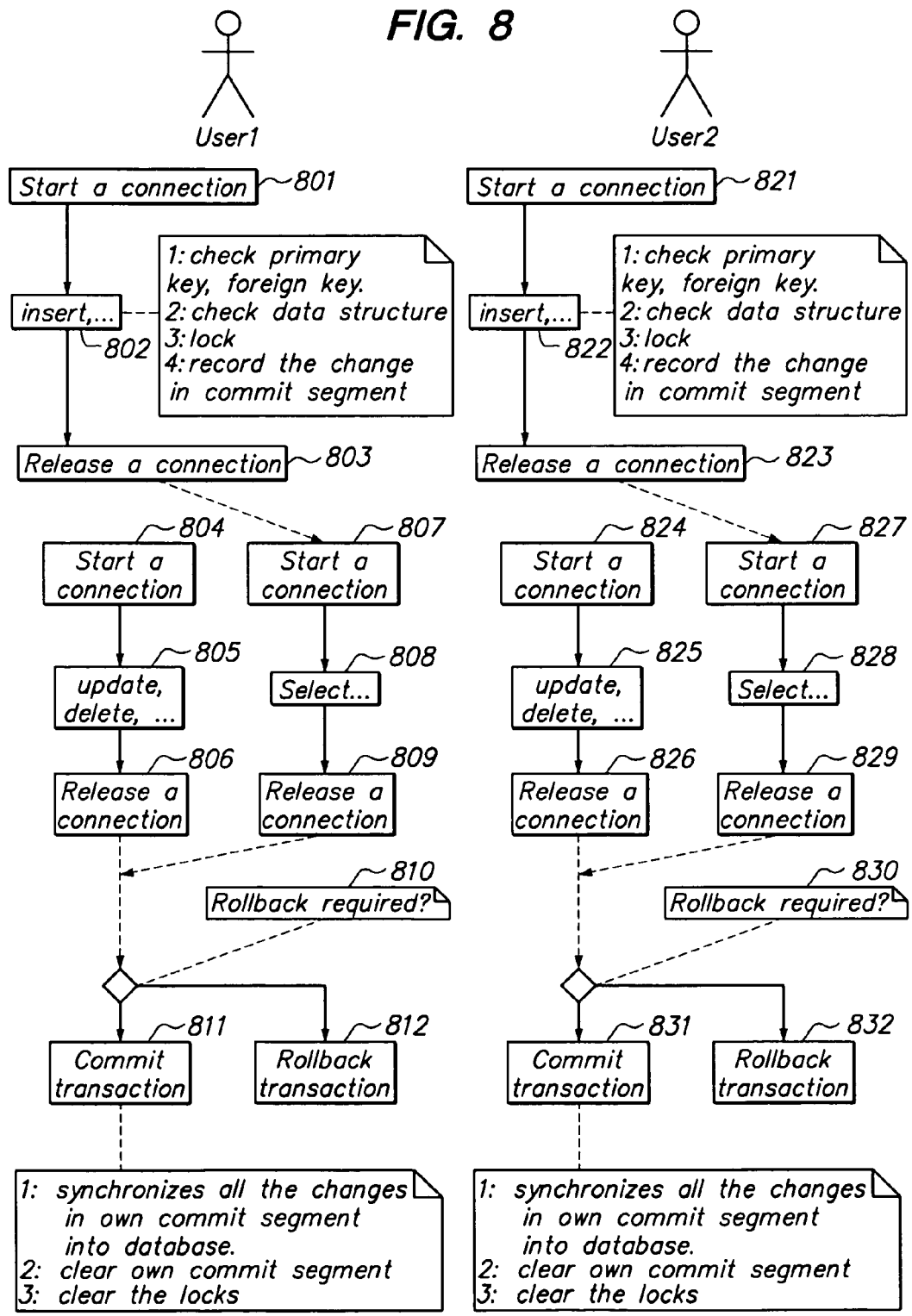
FIG. 8 is a flowchart illustrating a method for generic data manipulation according to an embodiment of the present invention.

FIG. 8 shows a flowchart of a method for generic data manipulation according to an embodiment of the present invention. A user1 may start a connection with a database at 801. The user1 may insert some data into the database at 802, and then releases the connection at 803. The user1 can perform update and delete operation at 804, 805, and 806, and perform select operation at 807, 808, and 809. Depending on whether a rollback is required at 810, the user1 can commit all operations together at 811, or rollback all operations together at 812. A user2 can perform similar operations in parallel at steps 821, 822, 823, 824, 825, 826, 827, 828, 829, 830, 831 and 832. Compared with the method shown in FIG. 1, the connection is held for a much shorter time.

The buffer 210 is not only used to temporarily store data from the user and data changed by operations of the user, but also used to temporarily store data retrieved from the data storage device 202. A skilled artisan would appreciate that performing operations in the buffer on data retrieved from the database is quicker than performing operations directly on data in the database. The performance of the middle layer could be further improved by buffering all data in the data storage device in the buffer with swapping algorithm.

While the invention has been described in detail above with reference to some embodiments, variations within the scope and spirit of the invention will be apparent to those of ordinary skill in the art. For example, although embodiments are described with reference to a computer, other electrical devices could be used.

What is claimed is:

1. A computer-implemented method for manipulating data in a database comprising:
responsive to a first command from a user to manipulate a first data object in the database:
allocating buffer storage to the first data object in a middle layer;
establishing a first connection to the database;
performing the first command upon the first data object in the buffer storage while maintaining the first connection;
performing a first step of storing any data changes caused by the first command in the buffer storage, wherein the first command is a call from the user to select one of a plurality of generic database manipulators in the middle layer which is in a server coupled to the database; and releasing the first connection after the first step of storing any data changes;

responsive to a second command from the user to manipulate a second data object in the database:

allocating buffer storage to the second data object in the middle layer;

establishing a second connection to the database;

performing the second command upon the second data object in the buffer storage while maintaining the second connection;

performing a second step of storing any data changes caused by the second command in the buffer storage;

releasing the second connection after the second step of storing any data changes; and in a single transaction performed after the first connection and the second connection have been released, one of committing all data changes caused by the first command and the second command to the database and rolling back all data changes caused by the first command and the second command.

2. The method of claim 1, wherein the first command and the second command are selected from the group consisting of insert, update, delete and search.

3. The method of claim 1, wherein the generic database manipulator is selected from the group consisting of: a generic database manipulator for inserting data into the database, a generic database manipulator for updating data in the database; a generic database manipulator for deleting data from the database; and a generic database manipulator for searching data in the database.

4. The method of claim 1, further comprising storing the data changes in the database in response to a user's call to a generic database manipulator for committing the data changes.

5. The method of claim 1, wherein the middle layer further comprises command rollback mechanisms.

6. The method of claim 5, further comprising clearing the data from the buffer storage in response to a user's call to the command rollback mechanisms.

7. The method of claim 1, further comprising dividing the buffer storage into a plurality of user specific commit segments, each of which keeps records only for one user.

8. The method of claim 7, wherein the commit segments are kept user specific by user stamps.

9. The method of claim 1, further comprising checking data structure of data received from the user against that of corresponding data in the database by the middle layer before performing a corresponding command.

10. The method of claim 9, further comprising providing an error message when the data structure of data received from the user and that of corresponding data in the database are different.

11. The method of claim 1, further comprising checking whether a new entry has a primary key by the middle layer before performing a corresponding command.

12. The method of claim 11, further comprising providing an error message when the primary key of the new entry exists in the database but the corresponding command is insert.

13. The method of claim 11, further comprising providing an error message when the primary key of the new entry does not exist in the database but the corresponding command is update.

14. The method of claim 1, further comprising checking whether a new entry has a foreign key before performing a corresponding command.

15. The method of claim 1, further comprising locking a record when the user accesses the record in the database.

16. The method of claim 1, further comprising checking the user's authority by the middle layer before performing a corresponding command.

17. The method of claim 1, further comprising buffering all data in the database to the buffer storage.

18. A computer program product stored in a computer-readable medium having instructions which, when executed on a computer, maintain an interface between a data storage device and a plurality of users, the interface comprising:

at least one generic database manipulator for performing a first user command and a second user command, wherein the first user command and the second user command are from the same user and respectively manipulate a first data object in the data storage device and a second data object in the data storage device;

a buffer section for storing data changes caused by the first user command and the second user command performed in the interface; and a command commit module for storing in the data storage device the data changes stored in the buffer section, wherein the interface is in a server coupled to the data storage device, wherein each of the first user command and the second user command is a call from the user to select the at least one generic database manipulator, wherein the instructions cause the computer to, responsive to the first user command:

allocate storage in the buffer section to the first data object;

establish a first connection to the data storage device;

perform the first user command upon the first data object in the buffer section while maintaining the first connection;

perform a first step of storing any data changes caused by the first user command in the buffer section; and release the first connection after the first step of storing any data changes, wherein the instructions cause the computer to, responsive to the second user command:

allocate storage in the buffer section to the second data object;

establish a second connection to the data storage device;

perform the second user command upon the second data object in the buffer section while maintaining the second connection;

perform a second step of storing any data changes caused by the second user command in the buffer section; and release the second connection after the second step of storing any data changes, and wherein the instructions cause the computer to, in a single transaction performed after the first connection and the second connection have been released, one of commit all data changes caused by the first user command and the second user command to the data storage device and roll back all data changes caused by the first user command and the second user command.

19. The computer program product of claim 18, wherein the first user command and the second user command are selected from the group consisting of insert, update, delete and search.

20. The computer program product of claim 18, wherein the generic database manipulator is selected from the group consisting of: a generic database manipulator for inserting data into the data storage device, a generic database manipulator for updating data in the data storage device; a generic database manipulator for deleting data from the data storage device; and a generic database manipulator for searching data in the data storage device.

21. The computer program product of claim 18, further comprising a rollback module for undoing the data changes caused by a corresponding user command.

22. The computer program product of claim 18, wherein the buffer section is divided into a plurality of user specific commit segments, each of the commit segments keeps records only for one user.

23. The computer program product of claim 22, wherein the commit segments are kept user specific by user stamps.

24. The computer program product of claim 18, further comprising a check data structure module, which checks the structure of data received from the user against that of corresponding data in the data storage device before performing a corresponding user command.

25. The computer program product of claim 18, further comprising a check primary key module, which checks whether a new entry has a primary key before performing a corresponding user command.

26. The computer program product of claim 18, further comprising a check foreign key module, which checks whether a new entry has a foreign key before performing a corresponding user command.

27. The computer program product of claim 18, further comprising a lock table module, which locks a record accessed by the user in the data storage device.

28. The computer program product of claim 18, further comprising an authority check module, which checks the user's authority before performing a corresponding user command.

29. The computer program product of claim 18, further comprising an exception handling module, which provides to the user an error message in response to an error.

30. The computer program product of claim 18, further comprising a buffer clearing module, which clears the buffer after a commit or rollback command.

31. A data storage system, comprising:
a data storage device; and
a middle layer comprising at least one generic database manipulator for performing a first user command and a second user command, wherein the first user command and the second user command are from the same user and respectively manipulate a first data object in the data storage device and a second data object in the data storage device;
a buffer section for storing data changes caused by the first user command and the second user command performed in the middle layer; and
a command commit module for storing in the data storage device the data changes stored in the buffer section,
wherein the middle layer is in a server coupled to the data storage device,
wherein each of the first user command and the second user command is a call from the user to select the at least one generic database manipulator,
wherein the middle layer is configured to, responsive to the first user command:
  allocate storage in the buffer section to the first data object;
  establish a first connection to the data storage device;
  perform the first user command upon the first data object in the buffer section while maintaining the first connection;
  perform a first step of storing any data changes caused by the first user command in the buffer section; and
  release the first connection after the first step of storing any data changes,
wherein the middle layer is configured to, responsive to the second user command:
  allocate storage in the buffer section to the second data object;
  establish a second connection to the data storage device;
  perform the second user command upon the second data object in the buffer section while maintaining the second connection;
  perform a second step of storing any data changes caused by the second user command in the buffer section; and
  release the second connection after the second step of storing any data changes, and
wherein the middle layer is configured to, in a single transaction performed after the first connection and the second connection have been released, one of commit all data changes caused by the first user command and the second user command to the data storage device and roll back all data changes caused by the first user command and the second user command.

32. The system of claim 31, wherein the first user command and the second user command are selected from the group consisting of insert, update, delete and search.

33. The system of claim 31, wherein the generic database manipulator is selected from the group consisting of: a generic database manipulator for inserting data into the data storage device, a generic database manipulator for updating data in the data storage device; a generic database manipulator for deleting data from the data storage device; and a generic database manipulator for searching data in the data storage device.

34. The system of claim 31, wherein the middle layer further comprises a command rollback module for undoing the data changes caused by a corresponding command.

35. The system of claim 31, wherein the buffer section is divided into a plurality of user specific commit segments, each of which keeps records only for one user.

36. The system of claim 35, wherein the commit segments are kept user specific by user stamps.

37. The system of claim 31, further comprising a module for checking data structure of data received from the user against that of corresponding data in the data storage device.

38. The system of claim 31, further comprising a module for checking whether a new entry has a primary key.

39. The system of claim 31, further comprising a module for checking whether a new entry has a foreign key.

40. The system of claim 31, further comprising a module for checking the user's authority.

41. The method of claim 1, wherein the generic database manipulator is independent of a type of a database.

42. The method of claim 1, wherein the middle layer is a pre-processor of the database.

* * * * *